United States Patent Office 2,895,891
Patented July 21, 1959

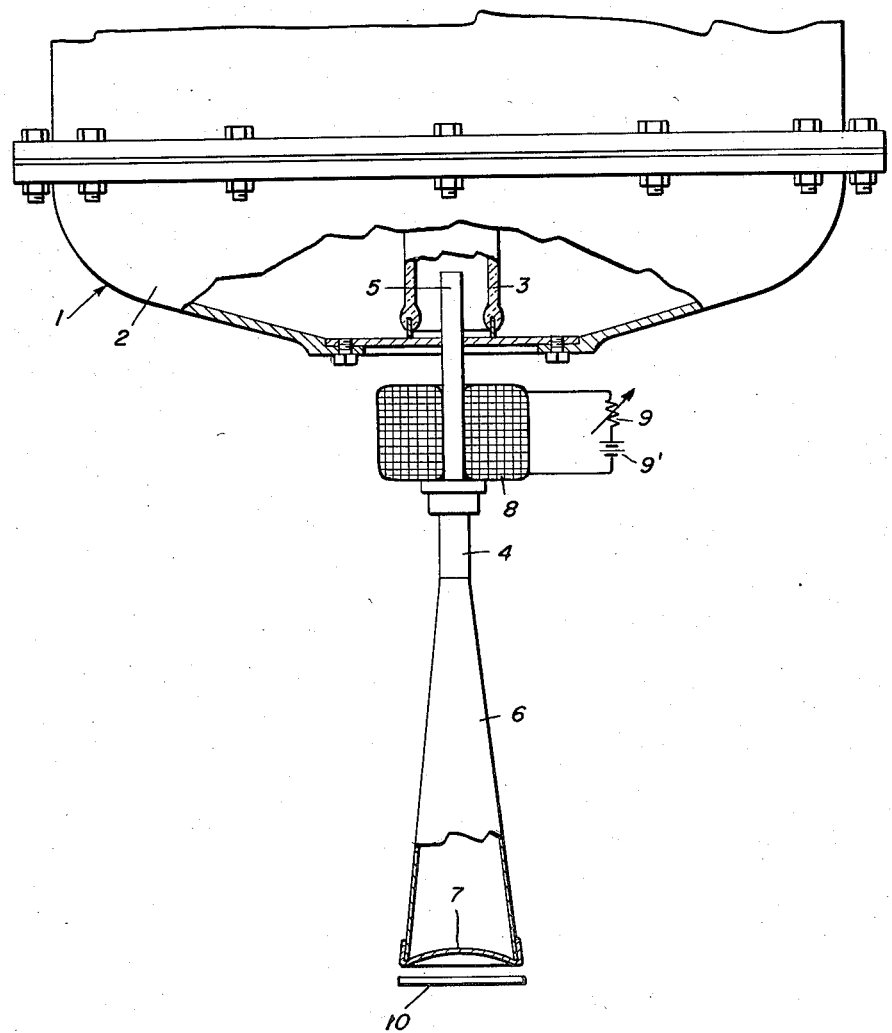
Inventor:
Alexander A. Miller,
by Paul A. Frank
His Attorney.

2,895,891

CELLULOSIC MATERIALS

Alexander A. Miller, Schenectady, N.Y., assignor to General Electric Company, a corporation of New York Application May 15, 1957, Serial No. 659,329

13 Claims. (Cl. 204—154)

This invention relates to the irradiation of cellulosic materials in the presence of water, and to the resulting products. More particularly, this invention relates to the irradiation of non-salt containing cellulosic materials with ionizing radiation in the presence of water, for example, cellulose ethers such as methyl cellulose and hydroxyethyl cellulose, and to the resulting products.

Heretofore, dry cellulosic materials have been treated with high energy irradiation. However, in all cases such treatment resulted in depolymerization or degradation of the cellulosic material so that insoluble cellulosic materials like cotton, wood pulp, wood, etc. were converted to water soluble materials.

Unexpectedly, I have now discovered that when non-salt containing cellulosic materials are irradiated in the presence of water instead of in a dry state, these materials cross-link rather than degrade.

The unexpectedness of this invention is enhanced by the fact that salts of cellulosic materials degrade on irradiation, whether irradiated in aqueous solution or in a dry state. For example, sodium carboxymethyl cellulose degraded whether irradiated dry or in 10% solutions.

Another unexpected feature of this invention is the fact that other solvents, even in the presence of water, fail to convert cellulosic material to a material which will cross link rather than degrade when irradiated. Thus, solvents like methanol, t-butanol, glycol diacetate, methyl pivalate, dimethyl sulfoxide, trimethyl phosphate and dimethyl carbonate did not assist cross-linking. Even solvents containing 50% by weight of water, for example 50-50 t-butanol-water solutions, did not aid in cross-linking cellulosic materials.

In general, the process is carried out by adding sufficient water to the cellulosic material to convert it to a material which will cross-link rather than degrade when irradiated. Preferably, the cellulosic material should be capable of absorbing large amounts of water. One convenient method of preparing the material for irradiation is to allow the material to become swollen with water prior to irradiation. Another convenient method is to irradiate an aqueous solution of the cellulosic material.

Cellulosic materials within the scope of this invention are non-salt containing polymers of glucose-residue units having the following type structure:

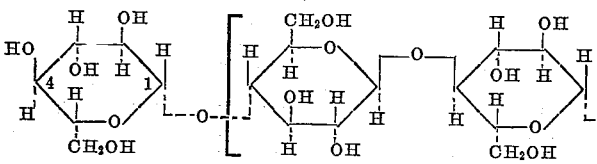

and derivatives thereof. The preferred cellulosic materials comprise those which are soluble in water, examples of which are cellulose ethers, such as alkyl cellulose (e.g. methyl-, ethyl-, propyl-, etc. cellulose), hydroxyalkyl cellulose, (e.g., hydroxymethyl-, hydroxyethyl-, etc. cellulose), and the like.

The amount of water in the cellulosic material necessary to convert it to a material capable of being cross-linked by ionizing radiation will vary within wide limits depending on the material. While there appears to be no upper limit to the amount of water which may be employed, except as it affects ease of operation, there is a minimum amount of water necessary to be effective. Although small amounts of water may cause cellulosic materials to cross-link to a minor degree when irradiated, for example, 10% or higher, at least 50% but preferably 90% of water, based on weight of cellulosic material, is employed for maximum results. Preferably, the cellulosic material should be dissolved in water or water-swollen to its saturation point. Such solutions or dispersions are best described as sols.

In the drawing there is shown high voltage accelerating apparatus 1 capable of producing a beam of high energy electrons for irradiating cellulosic materials in accordance with the invention. High voltage accelerating apparatus 1 may be of the type disclosed in Patent 2,144,518—Westendorp, assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 17, pp. 128–133 (December 1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in an arcuate shape as shown, greater strength for resisting the force of atmospheric pressure may be obtained for a given window thickness. Desired focusing of the accelerated electrons may be secured by a magnetic-field generating winding 8 energized by a source of direct current 9' through a variable resistor 9.

In producing cross-linked cellulosic materials according to the invention, a water containing cellulosic material 10 is supported in the path of the electrons emerging from end-window 7 as illustrated. The high energy electrons penetrate the polymeric material to a depth dependent upon their energy and effect the above modifications in the properties of the material. Of course cellulosic material, 10 can be in the form of strip material which is passed continuously under end-window 7 at a velocity selected to give the desired irradiation dosage. Other expedients for obtaining the irradiation of the polymeric materials in various shapes (e.g., fabrics, films, tubing, filaments, etc.) will be apparent to those skilled in the art. Uniform treatment of polymeric materials having appreciable thickness can be assured by irradiating them first from one side and then from the other or in some cases from both sides simultaneously. In certain instances, it may be desirable to irradiate the polymeric materials in an atmosphere of nitrogen, argon, helium, krypton or xenon, etc., to prevent the damaging effect of any corona which may be present.

The most commonly employed units for measuring high energy, ionizing radiation are (1) Roentgen units and (2) Roentgen equivalent physical units. Roentgen units are more commonly used to measure gamma and are usually defined as the amount of radiation that produces one electrostatic unit of charge per milliliter of dry air under standard conditions. The Roentgen equivalent physical unit (the "REP") is a convenient unit which usually describes the radiation dose from other than gamma, and is the measure of the ionization in the absorber or tissue. The ionization produced by primary radiation is expressed as one REP when the energy lost in tissue is equivalent to the energy lost by the absorption of one Roentgen of gamma in air. Further definitions of "Roentgen" and "REP" can be found on p. 256 of "The Science and Engineering of Nuclear Power," edited by Clark Goodman (1947), and on p. 436 of "Nuclear Radiation Physics," by Lapp and Andrews (1948). For convenience, the term "Roentgen equivalent physical" or "REP" will be used in the specification and appended claims.

The suitable radiation dose employed in carrying out this invention will, of course, depend upon the properties desired in the irradiated product and the particular cellulosic material employed. For example, doses of above $1 \times 10^6$ REP such as from about $1 \times 10^6$ to $1 \times 10^8$ REP, but preferably 1 to $50 \times 10^6$ REP can be employed.

After irradiation, the polymer may be dried by any suitable means such as, for example, heat, motion of air, reduced pressure, filtration, etc. or combinations thereof.

It will be readily realized that other forms of electron accelerating apparatus may be employed instead of high voltage apparatus 1, for example, linear accelerators of the type described by J. C. Slater in the "Reviews of Modern Physics," vol. 20, No. 3, pp. 473–518 (July 1948) may be utilized. To decrease wasteful energy absorption between the point of exit of electrons from the accelerating apparatus and the polymeric materials, a vacuum chamber having thin entrance and exit windows may be inserted in the space.

In general, the energy of the ionizing radiation preferably employed in the practice of my invention may range from about 50,000 to 20 million electron volts or higher depending upon materials and the shape and thickness of the materials. The preferable range is 100,000 to 10 million electron volts. Although high energy electron radiation is preferred since it produces a large amount of easily controllable high energy, ionizing radiation within a short period of time without rendering the product radioactive, many other sources of high energy, ionizing radiation may also be used in my invention. Examples of such ionizing radiation sources are gamma rays, such as can be obtained from $Co^{60}$, "burnt" uranium slugs, fission by-products, such as waste solution, separated isotopes, such as $Cs^{137}$, gaseous fission product liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, deuterons, $\alpha$ particles, fission fragments, such as are available from cyclotrons, etc.

In order that those skilled in the art may better understand how the present invention may be practiced, the following examples are given by way of illustration and not by way of limitation. All parts are by weight.

All irradiations were effected with the apparatus described in the drawing with 800 KVP electrons (KVP refers to the peak voltage in kilovolts generated by the inductance coil with the high voltage apparatus 1 during the conducting half cycle and thus a measure of the energy emerging from window 7). The materials were irradiated and then extracted with a large excess of water. The insoluble gel was separated, dried, and weighed. In cases where no gel was observed, the relative viscosity of the irradiated solution was compared to that of the unirradiated solution.

The following examples illustrate the cross-linking effect of high energy, ionizing radiation on methyl cellulose according to this invention and the degrading effect of high energy, ionizing radiation on dry methyl cellulose.

Thin films of methyl cellulose were cast from 5% aqueous solution of methyl cellulose (Dow "Methocel," 400 cps.). Some of these films were irradiated dry and others were swollen with water and irradiated as shown in Table I. The irradiated materials were then extracted with large excess of water and the insoluble gel dried and weighed. Specific viscosities ($\eta_{sp}$) were determined on the material irradiated when dry. Reduction in specific viscosity indicates degradation. Increase in percent gel indicates increased cross-linking. The results are presented in Table I.

*Table I*

| Ex. | Radiation Dose ($\times 10^6$ REP) | Condition During Irradiation | Percent Gel | $\eta_{sp}$ |
|---|---|---|---|---|
| 1 | 0 | dry | | 19.9 |
| 2 | 10 | do | | 1.5 |
| 3 | 0.5 | water swollen | ~0 | |
| 4 | 1.0 | do | 35.7 | |
| 5 | 10 | do | 64.7 | |
| 6 | 20 | do | 78.2 | |

From Table I it is evident that the irradiation of dry methyl cellulose results in degradation as indicated by a large decrease in specific viscosity as contrasted to the irradiation of the water swollen material which is rendered insoluble by cross-linking.

The following examples illustrate the irradiation of another cellulosic material, hydroxyethyl cellulose (Carbide & Carbon's "Cellosize").

A 10% aqueous solution of hydroxyethyl cellulose was irradiated at the doses indicated in Table II. To observe the effects of radiation on the dry samples of this material, films were cast from these solutions and dried.

The results are presented in Table II.

*Table II*

| Ex. | Radiation Dose ($\times 10^6$ REP) | Condition During Irradiation | Percent Gel | $\eta_{sp}$ |
|---|---|---|---|---|
| 7 | 0 | dry | | 1.88 |
| 8 | 10 | do | | 0.85 |
| 9 | 1 | 10% solution | 0 | |
| 10 | 5 | do | 30 | |
| 11 | 10 | do | 70 | |
| 12 | 60 | do | 90 | |

The following examples illustrate a further unexpected feature of the present invention in that salts of cellulosic materials are degraded on irradiation in aqueous solution as well as in a dry state.

Sodium carboxymethyl cellulose (Du Pont's sodium CMC, 14 WL grade) was irradiated both dry (by casting from solution and drying) and in 10% solutions. The results are presented in Table III.

Table III

| Ex. | Radiation Dose ($\times 10^6$ REP.) | $\eta_{sp}$ |
|---|---|---|
| 13 | | 7.2 |
| 14 | 10 (dry) | 1.4 |
| 15 | 10 (10% sol.) | 1.3 |

From this Table III it is evident that salts of cellulosic materials degrade whether irradiated either wet or dry.

The following examples illustrate another unexpected feature of this invention, illustrating that other solvents, even in the presence of water, fail to convert cellulosic materials to a material which will cross-link rather than degrade on irradiation.

*Example 16.*—Methyl cellulose (Dow "Methocel," 15 cps.) dissolved to a concentration of 10% in a 50% (by weight) of t-butanol water solvent was irradiated at $20 \times 10^6$ REP. The $\eta_{sp}$ of the irradiated solution was 1.6 as compared to a value of 3.3 for the unirradiated solution, thus indicating degradation.

A wide variety of cellulosic materials was irradiated as 10% solutions in a wide variety of organic solvents (without the presence of water) over a wide irradiation range (5 to $60 \times 10^6$ REP). Among the cellulosic materials were ethyl cellulose (Dow Ethocel—75 cps.), methyl cellulose (Dow "Methocel," 15 cps.), cellulose acetate propionate (Hercules, medium viscosity), cellulose acetate butyrate (Hercose C, medium viscosity). Solvents employed were methanol, t-butanol, glycol diacetate, methyl pivalate, dimethyl sulfoxide, trimethyl phosphate and dimethyl carbonate.

No gel was formed in any of these solutions. Instead, a decreasing viscosity of the solution was observed with increasing irradiation dosage in each case.

The following examples illustrate the irradiation of methyl cellulose ("Methocel," 400 cps.) as a 10% solution as compared to the irradiation of dry methyl cellulose. The results are presented in Table IV.

Table IV

| Ex. | Radiation Dose ($\times 10^6$ REP) | Condition During Irradiation | Percent Gel | $\eta_{sp}$ |
|---|---|---|---|---|
| 17 | 0 | | | 21 |
| 18 | 10 | dry | | 2.5 |
| 19 | 1 | 10% solution | | |
| 20 | 5 | do | trace | |
| 21 | 10 | do | 80 | |
| 22 | 20 | do | 90 | |
| | | | 100 | |

The results in Table IV show that, as compared to dry methyl cellulose which degrades on irradiation, aqueous solutions produced high yields of a cross-linked polymer.

The products of this invention can be used as improved cellulosic materials in those applications where cellulosic materials have heretofore been employed, taking into consideration that in the case of a water soluble cellulosic material the irradiated product is superior in that it has been rendered water insoluble. Thus, the products of this invention can be employed as fibers, tapes, fabrics, electrical insulating materials, etc. Water soluble cellulosic materials, for example, methyl cellulose, hydroxymethyl cellulose, etc. can be extruded from solution into a radiation field, dried, and rolled onto suitable reels.

While the present invention has been described by reference to particular embodiments and examples thereof, variations will readily occur to those skilled in the art. It is therefore intended in the appended claims to cover all equivalents as may be in the true spirit and scope of the foregoing description. In addition, various modifying agents, such as dyes, pigments, stabilizers, and other ingredients commonly added to cellulosic materials, etc. may be added to these compositions without departing from the scope of the invention.

What I claim as new and desire to secure by Letters Patent of the United States is:

1. A process of cross-linking cellulosic materials which comprises irradiating a non-salt containing, aqueous sol of a water dispersible cellulosic material with ionizing radiation having an energy equivalent to at least 50,000 electron volts to a radiation dose in the range of $1 \times 10^6$–$1 \times 10^8$ REP, said sol containing at least 50% by weight of water.

2. The process of claim 1 where the non-salt containing cellulosic material is a cellulose ether.

3. The process of claim 2 where the cellulose ether is an alkyl cellulose.

4. The process of claim 3 where the alkyl cellulose is methyl cellulose.

5. The process of claim 2 where the cellulose ether is a hydroxyalkyl cellulose.

6. The process of claim 5 where the hydroxyalkyl cellulose is hydroxyethyl cellulose.

7. A normally aqueous sol forming non-salt containing cellulosic material which has been cross-linked and rendered incapable of forming a sol with water by the process of claim 1.

8. The process of cross-linking cellulosic materials which comprises irradiating a non-salt containing, aqueous sol of a water dispersible cellulosic material with electrons having an energy equivalent to at least 50,000 electron volts to a radiation dose in the range of $10^6$ to $10^8$ REP, said sol containing at least 50% by weight of water.

9. The process of claim 8 wherein the non-salt containing cellulosic material is a cellulose ether.

10. The process of claim 9 wherein the cellulose ether is alkyl cellulose.

11. The process of claim 10 wherein the alkyl cellulose is methyl cellulose.

12. The process of claim 9 wherein the cellulose ether is a hydroxyalkyl cellulose.

13. The process of claim 12 wherein the hydroxyalkyl cellulose is hydroxyethyl cellulose.

References Cited in the file of this patent

Borgin et al.: "Trans. Faraday Soc.," vol. 49, pp. 956–967 (1953).

Edelman: "Fraser Forsch. V. Textiltech," vol. 4, pp. 407–412 (1953) (Chem. Abs., vol. 48, page 9681g, 1954).

Sisman et al.: ORNL-928, pp. 1–25, 53–78, June 29, 1951.

Saeman et al.: "I. and E. Chem.," vol. 44, pp. 2848–2851, December 1952.